US010956379B2

(12) United States Patent
Fernandez et al.

(10) Patent No.: US 10,956,379 B2
(45) Date of Patent: Mar. 23, 2021

(54) DYNAMIC LIFECYCLE MANAGEMENT OF TEMPORARY STORAGE SCHEMAS

(71) Applicant: Oracle International Corporation, Redwood Shores, CA (US)

(72) Inventors: Steve Simon Joseph Fernandez, Columbia, MO (US); Ashish Mittal, Foster City, CA (US)

(73) Assignee: ORACLE INTERNATIONAL CORPORATION, Redwood Shores (CA)

(*) Notice: Subject to any disclaimer, the term of this patent is extended or adjusted under 35 U.S.C. 154(b) by 281 days.

(21) Appl. No.: 15/961,671

(22) Filed: Apr. 24, 2018

(65) Prior Publication Data

US 2018/0314718 A1   Nov. 1, 2018

Related U.S. Application Data

(60) Provisional application No. 62/490,476, filed on Apr. 26, 2017.

(51) Int. Cl.
*G06F 16/21* (2019.01)
*G06F 11/34* (2006.01)
*G06F 16/23* (2019.01)

(52) U.S. Cl.
CPC ........ *G06F 16/211* (2019.01); *G06F 11/3433* (2013.01); *G06F 16/213* (2019.01); *G06F 16/219* (2019.01); *G06F 16/23* (2019.01)

(58) Field of Classification Search
CPC .... G06F 16/211; G06F 16/213; G06F 16/219; G06F 11/3433; G06F 16/23; G06F 2201/865; G06F 11/302
See application file for complete search history.

(56) References Cited

U.S. PATENT DOCUMENTS

| 10,417,198 | B1* | 9/2019 | Simonelic, II | .......... G06F 16/25 |
| 2014/0019410 | A1* | 1/2014 | Kemmler | .............. G06F 16/284 707/610 |

(Continued)

OTHER PUBLICATIONS

Abhinivesh Jain and Niraj Mahajan, A. Jain and N. Mahajan, The Cloud DBA-Oracle, DOI 10.1007/978-1-14842-2635-3_2, pp. 11-22 (Year: 2017).*

(Continued)

*Primary Examiner* — Cheyne D Ly
(74) *Attorney, Agent, or Firm* — Kilpatrick, Townsend & Stockton LLP

(57) ABSTRACT

Techniques are described that enable the dynamic and automatic life cycle management of database schemas. Temporary database schemas are dynamically and automatically allocated in response to database schema requests. Allocated schemas are also automatically reclaimed upon expiration. A dynamic schema allocation system is provided that is configured to receive database schema requests from one or more clients and dynamically and automatically, substantially free of any manual intervention, serve database schemas in response to the requests. The database schemas may be allocated from multiple database instances available to the dynamic schema allocation system. Attributes specified in a database schema request may be used to find a matching database instance and a schema is allocated for the request from the matching database instance.

19 Claims, 6 Drawing Sheets

(56) References Cited

U.S. PATENT DOCUMENTS

2015/0095973 A1* 4/2015 Neumueller ............ H04L 63/20
726/1
2018/0295194 A1* 10/2018 Deraz .................... G06Q 10/10
2019/0303382 A1* 10/2019 Bostic ................... G06F 16/258

OTHER PUBLICATIONS

Aulbach, S., A Comparison of Flexible Schemas for Software as a Service, SIGMOD'09, Jun. 29-Jul. 2, 2009, Providence, Rhode Island, USA, pp. 881-888. (Year: 2009).*
Khan, A., eDWaaS: A Scalable Educational Data Warehouse as a Service, Springer International Publishing AG, part of Springer Nature 2018 A. Abraham et al. (Eds.): ISDA 2017, AISC 736, pp. 998-1007, 2018. (Year: 2017).*
"Oracle® Fusion Middleware", Metadata Repository Builder's Guide for Oracle Business Intelligence Enterprise Edition 12c (12.2.1.2.0) E77712-02, Dec. 2016, 640 pages.
"Amazon Relational Database Service (RDS)" retrieved Dec. 3, 2019 from https://aws.amazon.com/rds/, 7 pages.
"Database Schema Request Form", UW-Madison Information Technology, retrieved on December from https://it.wisc.edu/database-schema-request-form/, 4 pages.
"Database from Oracle", Oracle, retrieved on Dec. 3, 2019 from https://cloud.oracle.com/database, 7 pages.
Agrawal; Nilesh, "Schema-as-a-Service implementation using Oracle Enterprise manager 12c", Oracle, Jun. 10, 2013, retrieved from https://blogs.oracle.com/oem/schema-as-a-service-implementation-using-oracle-enterprise-manager-12c-v2, 6 pages.

* cited by examiner

DYNAMIC LIFECYCLE MANAGEMENT OF TEMPORARY STORAGE SCHEMAS

CROSS-REFERENCES TO RELATED APPLICATIONS

This application claims the benefit and priority from U.S. Provisional Application No. 62/490,476, filed Apr. 26, 2017, entitled DYNAMIC LIFECYCLE MANAGEMENT OF REMOTE TEMPORARY STORAGE SCHEMAS, the entire contents of which are incorporated herein by reference for all purposes.

BACKGROUND

The proliferation and popularity of data-intensive technologies such as cloud computing, big data analysis, mobile computing, etc., has led to a dramatic increase in demand for databases to support these data-intensive technologies. The increased demand for database structure has led to multiple users or clients requesting the use of database schemas on demand. For example, temporary storage schemas may be used for requested for a wide variety of applications. For example, a temporary storage or database schema may be requested during test runs of a software that uses databases. Conventional techniques for servicing such client requests and providing the requested schemas are very time consuming and cumbersome. For example, according to one conventional technique, a centralized database is set up and schemas manually provided from this database. Every client using the central database is provided master credentials to the central database that leads to collisions (e.g., duplicate schema names, users, etc. used concurrently by multiple clients). For example, when two users use the single central database and they both want to define a variable with the same name this may lead to a data collision. According to another technique, a separate database instance is created for each client. This however is very resource intensive. Further, for all the conventional techniques, upon receiving a request for a storage schema, the schema has to be manually created and provisioned, for example, by a database administrator. This manual process is very time consuming and human-resource intensive, and can lead to human-based errors in database management system resource allocation.

BRIEF SUMMARY

The present disclosure relates generally to the allocation of database schemas. More particularly, techniques are described that enable the dynamic and automatic life cycle management of database schemas. In certain embodiments, temporary database schemas are dynamically and automatically allocated in response to database schema requests. Allocated schemas are also automatically reclaimed upon expiration. Various inventive embodiments are described herein, including methods, systems, non-transitory computer-readable storage media storing programs, code, or instructions executable by one or more processors, and the like.

In certain embodiments, a dynamic schema allocation system or infrastructure is provided that is configured to receive database schema requests from one or more clients and dynamically and automatically, substantially free of any manual intervention, serve database schemas in response to the requests. The dynamic schema allocation system may receive schema requests from different types of clients and may service the requests by serving out schemas from multiple database instances available to the dynamic schema allocation system. The available database instances may be from multiple database vendors (e.g., Oracle, Microsoft MySQL, IBM, etc.) and of different types of databases.

In certain embodiments, upon receiving a database schema request from a client, the novel dynamic schema allocation system may determine the attributes identified in the request. These attributes may identify the functions, capabilities, characteristics, etc. required or desired by the schema requestor in the schema being requested. Examples of attributes may include, without limitation, a time period for which the temporary database schema is requested, type of schema, (e.g., a type of the schema, a specific vendor, size of the schema, functionalities to be supported by the schema, etc.) to be provided by the schema, and other like requirements. The dynamic schema allocation system may then identify, from the multiple different available database instances, a particular database instance that matches or satisfies the attributes determined from the request. The dynamic schema allocation system may then allocate a database schema from the particular database instance and serve the allocated schema to the requesting client in response to the schema request. The client device may then access and use the allocated database schema.

In certain embodiments, the schemas provided by the dynamic schema allocation system are temporary schemas that are usable by the requesting client for a certain time period. The time period may be specified as an attribute in the schema request received by the dynamic schema allocation system from the client. Once that time period associated with the allocated temporary database schema has expired, the schemas is reclaimed by the dynamic schema allocation system.

In certain embodiments, the dynamic schema allocation system may identify multiple database instances that match or satisfy the attributes specified by a schema request. These multiple database instances may potentially be from different database vendors. In such situations, the dynamic schema allocation system may use various techniques to dynamically and automatically identify a particular database instance to be used for servicing the request from the multiple matching database instances. For example, in certain instances, the dynamic schema allocation system may determine the particular database instance from the multiple matching instances by performing load balancing processing. The dynamic schema allocation system may determine the load on each of the multiple eligible database instances and select one with the lowest load. The requested database schema may then be allocated from this one selected database instance.

One or more embodiments offer advantages over conventional database schema allocations. One or more embodiments may provide a single point of contact for any type and number of temporary schemas for clients. One or more embodiments may support different communication protocols between one or more client devices and the dynamic schema allocation system. One or more embodiments may provide database vendors the ability to add new database interfaces and database instances without bringing down the database schema allocation system. One or more embodiments may provide load balancing to efficiently distribute database schemas between database instances depending on multiple factors. One or more embodiments may provide maximum utilization of resources by not requiring set up time by a client device and by sharing database instances across multiple clients. One or more embodiments may prove minimal conflicts because each database schema may be assigned different access credentials and space, thus there may be no or limited conflicts (e.g., collision) between multiple client devices even if the client devices create or access artifacts with the same name.

In certain embodiments, a data processing system, may receive from a requestor, a request for a database schema. The data processing system may determine a set of one or more attributes specified in the request. The data processing system may access first information associated with a plurality of database instances. For each database instance in the plurality of database instances, the first information may identify one or more attributes associated with the database instance. The data processing system may select, based upon the first information and the set of one or more attributes determined from the request, a first database instance from the plurality of database instances. The selecting the first database instance may comprise comparing the set of one or more attributes specified in the request with the attributes associated with the plurality of database instances to identify a set of one or more database instances from the plurality of database instances that satisfy the set of attributes specified in the request. The set of one or more database instances may include the first database instance. The data processing system may allocate, based upon the set of one or more attributes specified in the request, a database schema from the first database instance. The data processing system may generate a response to the request. The response may comprise information that enables the requestor to access and use the allocated database schema. The data processing system may transmit the response from the data processing system to the requestor.

In certain embodiments, the set of one or more attributes specified in the request may include at least one of: a schema type, a schema memory size, a capability to be provided by the schema, a language to be supported by the schema, or a particular version of a database.

In certain embodiments, the set of one or more database instances may comprise multiple database instances including the first database instance and a second database instance. The first database instance may be a database instance from a first vendor and the second database instance may be a database instance from a second vendor. The second vendor can be different from the first vendor.

In certain embodiments, the set of one or more database instances may comprise multiple database instances. The data processing system may determine a load value for each database instance in the set of one or more database instances. The data processing system may determine that the first database instance has the lowest load value compared to other database instances in the set of one or more database instances.

In certain embodiments, the data processing system may determine the load value for each database instance in the set of one or more database instances by determining, for the database instance, a number of current connections to the database instance or determining, for the database instance, or a number of prior connections to the database instance.

In certain embodiments, the set of attributes specified in the request may include an attribute indicating that the database schema is requested for a first time period. The data processing system may determine the load value for each database instance in the set of one or more database instances comprises using the first time period to determine the load value.

In certain embodiments, the data processing system may generate the response by generating access credentials for the database schema. The access credentials may include one or more credentials for accessing the allocated database schema generates access credentials for the database schema. The data processing system may include the access credentials in the response.

In certain embodiments, the set of the set of attributes specified in the request may include an attribute indicating a first format to be used for the response. The data processing system may generate the response according to the first format.

In certain embodiments, the set of attributes specified in the request may include an attribute indicating a first protocol to be for the response. The data processing system may transmit the response using the first protocol.

In certain embodiments, the data processing system may generate the response in a machine-readable format.

The foregoing, together with other features and embodiments will become more apparent upon referring to the following specification, claims, and accompanying drawings.

DETAILED DESCRIPTION

Figure 1:
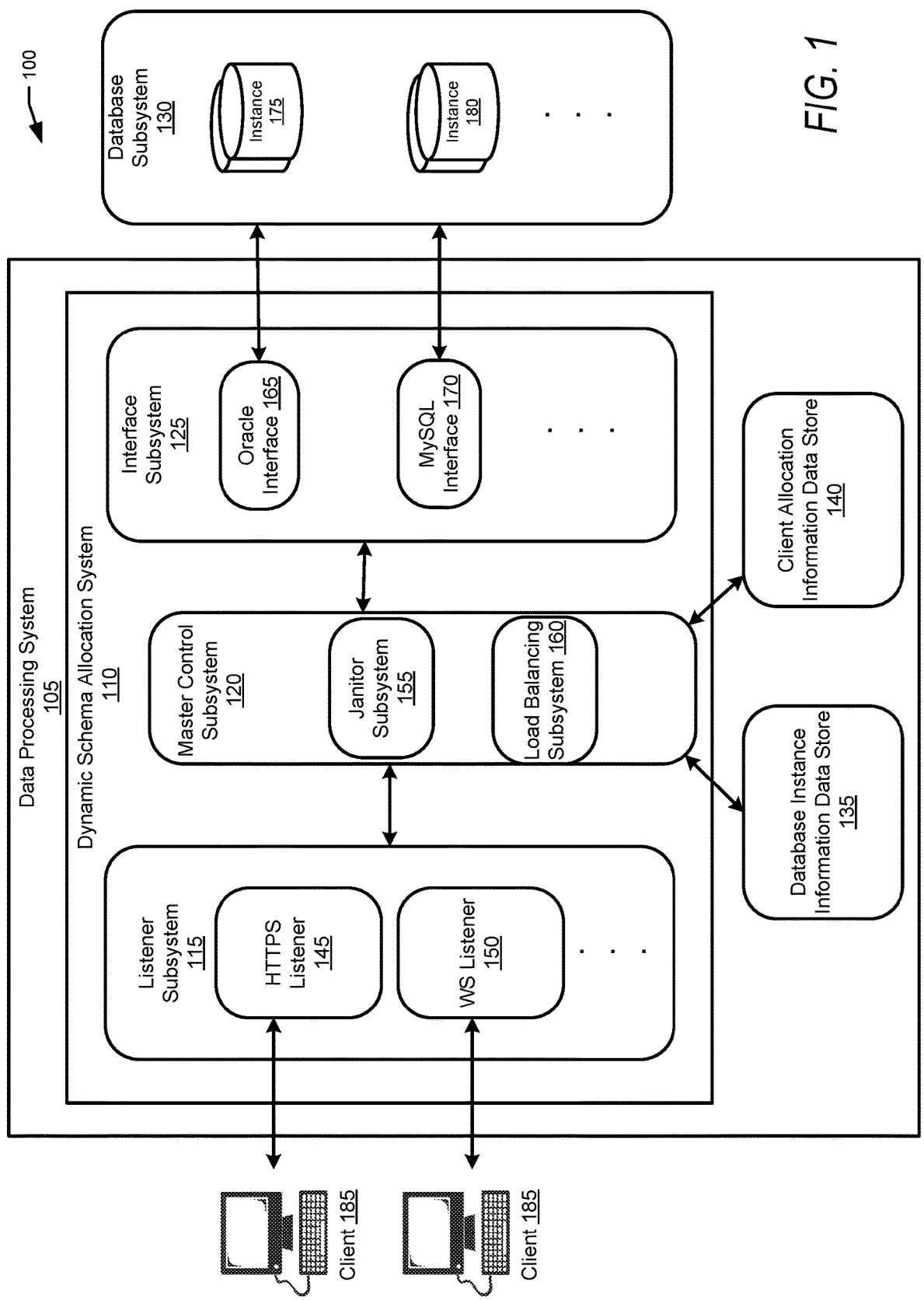
FIG. 1 depicts a simplified block diagram of a distributed environment according to certain embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to the allocation of storage or database schemas. More particularly, techniques are described that enable the dynamic and automatic life cycle management of storage or database schemas. In certain embodiments, temporary database schemas are dynamically and automatically allocated in response to database schema requests. Allocated schemas are also automatically reclaimed upon expiration. Various inventive embodiments are described herein, including methods, systems, non-transitory computer-readable storage media storing programs, code, or instructions executable by one or more processors, and the like.

In certain embodiments, a dynamic schema allocation system or infrastructure is provided that is configured to receive database schema requests from one or more clients and dynamically and automatically, substantially free of any manual intervention, serve database schemas in response to the requests. The dynamic schema allocation system may receive schema requests from different types of clients and may service the requests by serving out schemas from multiple database instances available to the dynamic schema allocation system. The available database instances may be from multiple database vendors (e.g., Oracle, Microsoft MySQL, IBM, etc.) and of different types of databases.

In certain embodiments, upon receiving a database schema request from a client, the novel dynamic schema allocation system may determine the attributes identified in the request. These attributes may identify the functions, capabilities, characteristics, etc. required or desired by the schema requestor in the schema being requested. Examples of attributes may include, without limitation, a time period or duration of time for which the temporary database schema is requested, schema type (e.g., a type of schema (e.g., Oracle), a size of the schema, functionalities to be supported by the schema, etc.) to be provided by the schema, a desired format of the reply from the dynamic schema allocation system (e.g., JavaScript Object Notation (JSON), properties, etc.) and other like requirements. The dynamic schema allocation system may then identify, from the multiple different available database instances, a particular database instance that matches or satisfies the attributes determined from the request. The dynamic schema allocation system may then allocate a database schema from the particular database instance and serve the allocated schema to the requesting client in response to the schema request. The client device may then access and use the allocated database schema.

In certain embodiments, the schemas provided by the dynamic schema allocation system are temporary schemas that are usable by the requesting client for a certain time period. The time period may be specified as an attribute in the schema request received by the dynamic schema allocation system from the client. Once that time period associated with the allocated temporary database schema has expired, the schemas is reclaimed by the dynamic schema allocation system.

In certain embodiments, the dynamic schema allocation system may identify multiple database instances that match or satisfy the attributes specified by a schema request. These multiple database instances may potentially be from different database vendors. In such situation, the dynamic schema allocation system may use various techniques to dynamically and automatically identify a particular database instance to be used for servicing the request from the multiple database instances, and then allocate the requested schema from that particular database instance. For example, in certain instances, the dynamic schema allocation system may determine the particular database instance from the multiple matching instances by performing load balancing processing. The dynamic schema allocation system may determine the load on each of the multiple eligible database instances and select one with the lowest load. The requested database schema may then be allocated from this one selected database instance.

Accordingly, techniques are described herein for dynamically and automatically, substantially free of any manual intervention, allocating temporary database schemas from database instances. One or more temporary database schemas may be allocated from a single database instance. Each database schema represents a portion of the database instance. A database schema can comprise tables, relationships between them, and logic that can be executed when data is added/modified/deleted to the tables. A database schema is similar to and acts as a single user mini-database. A database schema provides database connections with data transfer and query capabilities.

FIG. 1 illustrates a simplified block diagram of a distributed environment 100 incorporating an exemplary embodiment. In the depicted embodiment, distributed environment 100 comprises a data processing system 105 comprising a dynamic schema allocation system 110 and multiple client devices 185 communicatively coupled with data processing system 105. Client devices 185 may communicate with data processing system 105 via one or more communication networks (e.g., the Internet) familiar to those skilled in the art that can support data communications using any of a variety of commercially-available protocols, including without limitation TCP/IP (transmission control protocol/Internet protocol), SNA (systems network architecture), IPX (Internet packet exchange), a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks. The embodiment depicted in FIG. 1 also shows a database subsystem 130 that is communicatively coupled with data processing system 105 via one or more communication networks (e.g., the Internet) familiar to those skilled in the art.

Distributed environment 100 depicted in FIG. 1 is merely an example and is not intended to unduly limit the scope of claimed embodiments. One of ordinary skill in the art would recognize many possible variations, alternatives, and modifications. For example, in some implementations, distributed environment 100 may have more or fewer systems or components than those shown in FIG. 1, may combine two or more systems, or may have a different configuration or arrangement of systems. For example, in some embodiments, database subsystem 130 may be part of dynamic schema allocation system 110. While dynamic schema allocation system 110 in FIG. 1 is shown as part of data processing system 105, this is not intended to be restrictive or limiting. In other embodiments, dynamic schema allocation system 110 may be deployed across multiple data processing systems.

Data processing system 100 may comprise one or more processors and memory resources. The one or more processors may include single or multicore processors. The one or more processers may operate under the control of software stored on a non-transitory computer-readable memory or medium. The methods or operations performed by data processing system 100 and dynamic schema allocation system 110 may be executed by the one or more processors.

Dynamic schema allocation system 110 is configured to receive database schema requests from one or more clients 185 and dynamically and automatically, substantially free of any manual intervention, serve database schemas in response to the requests using database instances available in database subsystem 130. As depicted in FIG. 1, dynamic schema allocation system 110 comprises multiple subsystems including a listener subsystem 115, a master control subsystem 120, and an interface subsystem 125. These subsystems may be implemented in software (e.g., code, instructions executed by one or more processors), or hardware, or combinations thereof. The various subsystems work cooperatively to provide the functions performed by dynamic schema allocation system 110. The various subsystems and their arrangement depicted in FIG. 1 is merely an example and is not intended to unduly limit the scope of claimed embodiments. One of ordinary skill in the art would recognize many possible variations, alternatives, and modifications. For example, in some implementations, dynamic schema allocation system 110 may have more or fewer subsystems than those shown in FIG. 1, may combine two or more subsystems, or may have a different configuration or arrangement of subsystems.

In certain embodiments, listener subsystem 115 may be configured to listen for and receive incoming schema requests from clients and also to provide responses to those requests back to the clients. The incoming requests may be in different data formats or protocols, such as, Hypertext Transfer Protocol (HTTP), Web Service (WS), and the like. Accordingly, listener subsystem 115 may comprise multiple listeners [The word "plurality" should only be used in the claims, elsewhere use the word multiple or other like word.], each configured to listen to and handle a particular type (or types) of format or protocol. For example, as shown in FIG. 1, listener subsystem 115 includes a HTTPS listener 145, a Web Service listener 150, and other listeners For example, HTTPS listener 145 may receive communications formatted according to Hypertext Transfer Protocol (HTTP) or HTTPS. Web Service listener 150 may receive communications formatted according to one or more web services protocols including: Web Processing Service (WPS), Web Services Conversation Language (WSCL), JavaScript Object Notation (JSON) based protocols, Extensible Markup Language (XML) based protocols, and the like. Although only two listeners are depicted in FIG. 1 it is possible to implement various other listeners. New listeners can be added at any time as desired, thereby providing the ability to dynamically increase and expand the scope and capabilities of dynamic schema allocation system 110.

Upon receiving a database schema request from a client, listener subsystem 115 may be configured to forward the received request to master control subsystem 120 for further processing. Master control subsystem 120 may perform a majority of the functions of dynamic schema allocation system 110 and also control and synchronize the operations performed by other subsystems of dynamic schema allocation system 110.

In certain embodiments, master control subsystem 120 is configured parse an incoming schema request to identify attributes specified by the request. Master control subsystem 120 may then, working in cooperation with interface subsystem 125 and database subsystem 130, identify, from the multiple different available database instances in database subsystem 130, a particular database instance that matches or satisfies the requested database schema associated attributes specified in the request. Master control subsystem 120 may then allocate a temporary database schema from the particular database instance and, using listener subsystem 115, serve the allocated schema to the requesting client in response to the schema request. In situations where multiple database instances are identified as matching or satisfying the attributes specified by a schema request, master control subsystem 120 may use various techniques (e.g., load balancing) to dynamically and automatically identify a particular database instance to be used for servicing the request. Master control subsystem 120 may then allocate the requested database schema from this one selected database instance.

Master control subsystem 120 may use various pieces of information to facilitate its operations. This information may be stored in one or more data stores accessible to dynamic schema allocation system 110. These data stores may be stored local to or may be remote from dynamic schema allocation system 110. For example, as shown in FIG. 1, master control subsystem 120 may access a data store 135 storing database instance information and a data store 140 storing client allocation information. The data stores may be implemented using persistent non-volatile memory.

Database instance information data store 135 may comprise of one or more memory stores and may store information about database instances registered with dynamic schema allocation system 110. As previously described, dynamic schema allocation system 110 allocates database schemas in response to incoming schema request from database instances available to dynamic schema allocation system 110. In certain embodiments, each database instance that is made available to dynamic schema allocation system 110 has to be first registered with dynamic schema allocation system 110. The database instance information stored in data store 135 may include this registration information for the multiple available database instances.

In certain embodiments, the database instances may be provided and made available to dynamic schema allocation system 110 by $3^{rd}$ parties such as vendors of the databases. For example, a vendor such as Microsoft® may provide one or more database instances of an Azure SQL database. In another embodiment, a vendor such as Oracle® may provide one or more database instances of an Oracle database. Each database instance may be registered with dynamic schema allocation system 110 and information associated with that instance may be stored in database instance information data store 135.

In certain embodiments, some portions of the database instance information for a database instance may be provided as part of the registration process for a database instance. For example, information identifying the attributes of the database instance may also be provided and stored in data store 135 as part of database instance information. The attributes for a database instance may identify the functions, capabilities, characteristics, etc. of the database instance. Attributes information associated with a database instance may include, for example, information identifying a database instance size (e.g. memory), a database type (e.g., may identify a database vendor such as Oracle®, IBM®, Microsoft® or a certain type or name of a database such as DB2 database instance, Azure SQL or MySQL database instance, etc.), a database instance version (e.g., Oracle Database 12c, Oracle Database 11g, Oracle Database 10g, mySQL version 5.6, mySQL version 5.7, etc.), database instance capabilities (e.g. languages supported, data formats supported, operations supported, transaction definitions, particular organization of database objects, error handling features, rollback features for transactions, operating system/software support, and the like), and the like. The database instance information for a database instance may also include information identifying the free space remaining on the database instance that can be used by dynamic schema allocation system 110 for allocating schemas in response to database schema requests. Accordingly, dynamic schema allocation system 110 may use the information stored in database instance information data store 135 to identify the available database instances, their attributes, and how much of each database instance is available for allocation to schema requests.

Client allocation information data store 140 may comprise one or more memory stores and may store information about schemas that have already been allocated in response to database schema requests received by dynamic schema allocation system 110. In certain embodiments, whenever a database schema from a database instance is allocated in response to a request by dynamic schema allocation system 110, allocation information is stored in client allocation information data store 140 by master control subsystem 120. The information stored in data store 140 may include, for example, information identifying the client/requestor (e.g., a client identifier or client device identifier identifying the source of the database schema request) to whom the database schema has been allocated, a database schema identifier, access credentials for the allocated database schema identifying how the client/requestor can access and use the allocated database schema, the database instance from which the database schema was allocated, time information identifying a period of time when the client can use and access the allocated database schema (e.g., a starting time value and an ending time value identifying when the database schema can be used by the client), a time when the database schema was allocated and transmitted to the requestor and the like.

Database subsystem 130 is configured to store the multiple database instances (e.g., database instance 175, database instance 180, and potentially many others) that are used by dynamic schema allocation system 110 for servicing database schema requests. Each database instance corresponds to a different underlying database. One or more database instances of different types or from different vendors and possibly with different capabilities may be provided and made available to dynamic schema allocation system 110 for database schema allocation.

As described above, several different types of database instances may be available for use by dynamic schema allocation system 110 for allocating temporary database schemas. In certain embodiments, dynamic schema allocation system 110 comprises an interface subsystem 125 that enables the master control subsystem 120 to communicate and interact with the different database instances. Interface subsystem 125 may comprise multiple database interfaces for interacting with different database instances. For example, in the embodiment depicted in FIG. 1, interface subsystem 125 includes an Oracle interface 165 for communicating with Oracle database instances, a MySQL interface 170 for communicating with MySQL database instances and the like. New database instance interfaces as well as new database instances can be added at any time as desired, thereby providing the ability to dynamically increase and expand the scope and capabilities of dynamic schema allocation system 110.

In certain embodiments, upon startup, master control subsystem 120 may initialize the different database interfaces and establish communications with the different database instances that are pre-configured with a particular database interface. Master control subsystem 120 may then, based upon the information stored in the database instances information data store 135 and the client allocation information data store 140 determine how many database instances of each database type are registered and determine the free space available on each database instance that can be utilized for servicing database schema requests.

In certain embodiments, master control subsystem 120 may itself include other subsystems. For example, as depicted in FIG. 1, master control subsystem 120 comprises a janitor subsystem 155 and a load balancing subsystem 160. Janitor subsystem 155 may be responsible for determining when one or more allocated database schemas have expired. For example, janitor subsystem 155 may query client allocation information data store 140 to access an expiration time associated with one or more database schema allocations. When it is determined that a data schema allocation has expired, janitor subsystem 155 may revoke access credentials associated with the database schema allocation and free the corresponding database schema and return it to its corresponding database instance.

As described above, in certain situations, multiple database instances may be identified as matches for attributes specified in a database schema request. Master control subsystem 120 may then perform additional processing to select a single database instance from the multiple matching database instances, and then use the selected database instance to perform the allocation for the database schema request. In some embodiments, this additional processing may involve determining the load on each of the multiple matching database instances and selecting one with the lowest load. Load balancing subsystem 160 may be responsible for performing this load-based selection. In some embodiments, load balancing subsystem 160 may query database instance information data store 135 to determine one or more characteristics of the multiple matching database instances. For each matching database instance, load balancing subsystem 160 may query client allocation information data store 140 to determine current allocation information associated with the database instance. From the retrieved information, load balancing subsystem 160 may then determine a particular database instance with the lowest load. This particular database instance is then used by master control subsystem 120 for allocating a temporary database schema for a database schema request.

A client device 185 may be a computing device such as: a portable handheld device, a mobile phone, a smart phone, a tablet, a wearable device, or stationary device running one or more operating systems. Although only two client devices are depicted in FIG. 1, this is not intended to be restrictive in any way. Dynamic schema allocation system 110 may receive database schema requests from multiple clients of client devices. In some instances, a user using a client device may configure a database schema request, which is then communicated from the client device to dynamic schema allocation system 110. In some other instances, a database schema request may be configured by a program or application executing on a client device.

For each received database schema request, dynamic schema allocation system 110 is configured to prepare and send a response to the client requesting a database schema. If dynamic schema allocation system 110 was able to allocate a temporary database schema as requested, then the response may include information that enables the requestor to access and use the allocated temporary database schema. If dynamic schema allocation system 110 was unable to allocate a temporary database schema as requested, then the response may indicate that the requested schema could not be allocated. In certain embodiments, the response may be in machine-readable format so that it can be consumed by a program or application capable of reading the machine-readable format.

Figure 2:
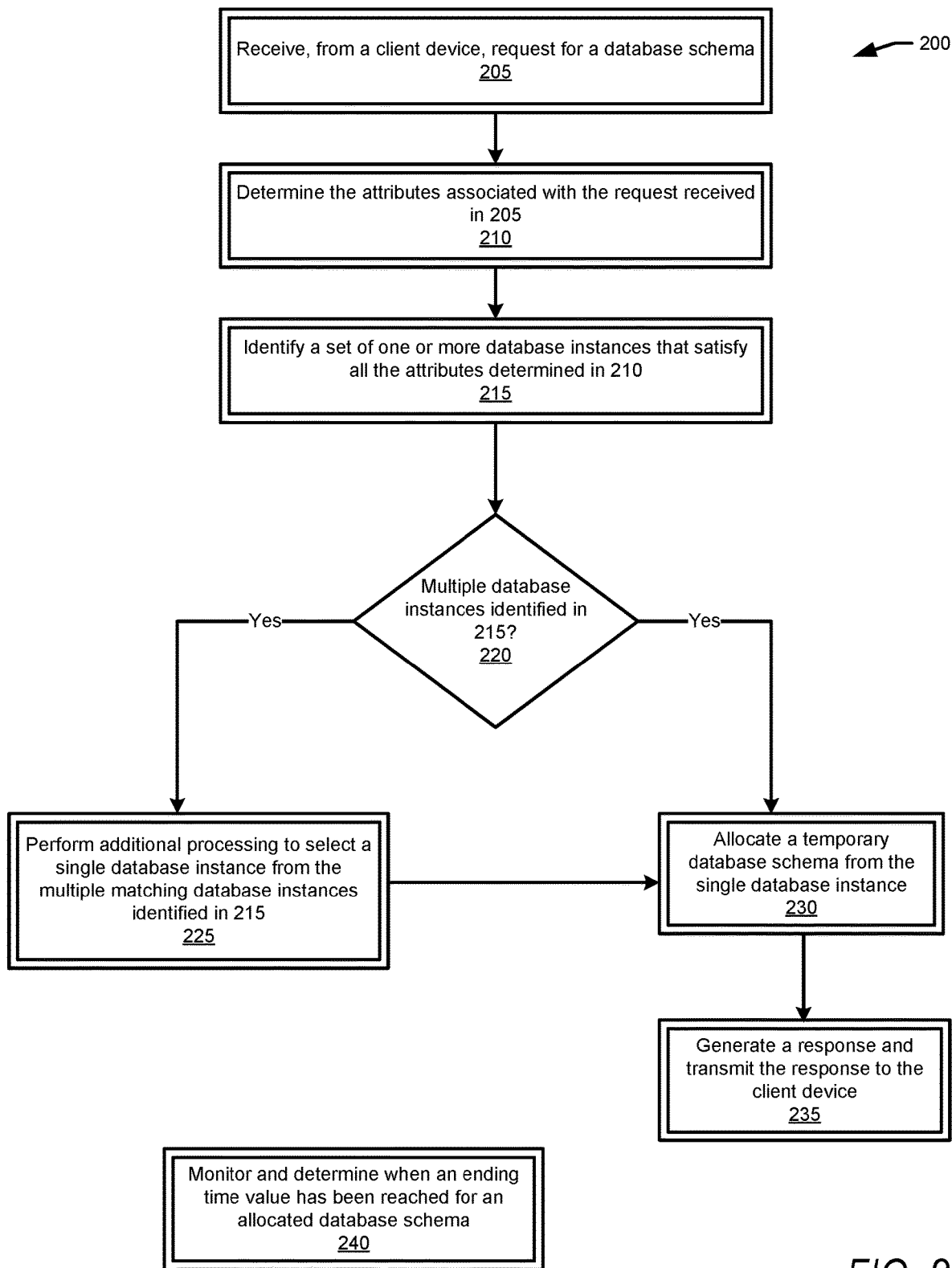
FIG. 2 depicts a simplified flow chart depicting a method of dynamically and automatically allocating and reclaiming database schemas according to certain embodiments.

FIG. 2 depicts a simplified process 200 for dynamically allocating and reclaiming temporary database schemas according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 2 may be performed by dynamic schema allocation system 110.

At 205, dynamic schema allocation system 110 may receive a request for a temporary database or storage schema from a client or requestor. In some embodiments, a listener of listener subsystem 115 may receive the request from a client device. The listener that receives the request may depend upon the protocol or format used for communicating the request from the client device to the dynamic schema allocation system 110.

Dynamic schema allocation system 110 may support various different communication protocols and formats and may provide listeners for different protocols. A listener of listener subsystem 115 may receive communications compliant with one or more formats supported by the listener. In some embodiments, each listener has its own Uniform Resource Locator (URL) address. A client device can send a database schema request to dynamic schema allocation system 110 by invoking a particular destination URL corresponding to the format or protocol (e.g., XML) to be used for the communication.

In certain embodiments, a request for a temporary database schema received by dynamic schema allocation system 110 may include source information (e.g., client device identifier) identifying a client (e.g., a client device) or requestor of the schema and destination information (e.g., destination URL.) The request may include information that is parsed by dynamic schema allocation system 110 to determine the attributes associated with the request. For example, the request may include attributes required or desired in the database schema being requested such as: a database schema size, a time duration for which the schema is required, a format of reply (e.g. JSON, XML, etc.), a database type (e.g., a specific vendor or type of database to be used for the database schema), a database version to be used for the schema, other database schema capabilities (e.g., languages supported, data formats supported, operations supported, transaction definitions, particular organization of database objects, error handling features, rollback features for a transaction, operating system/software support, etc.) and the like. For example, a request may specify the attributes as shown in Example 1 below.

Example 1

Database Schema Request Attributes database type=Oracle
database schema size=100 MB
required time duration=4 hours
format of response/reply=JSON
database capabilities=PL/SQL language commands.

It should be noted that the attributes specified in the requests may be different from one request to another depending upon the needs of the requestor. For example, in some instances, as indicated in the example above, the attributes specify a specific database vendor Oracle. This is not required. In some instances, the database schema request may not identify any specific vendor or type. The requested capabilities for the requested database schema may be different between requests. For example, in one example, the request specify attributes as shown in Example 2 shown below:

Example 2

Database Schema Request Attributes database schema size=10 MB
required time duration=3 hours
database capabilities=compatible with Windows® operating system.

At 210, dynamic schema allocation system 110 may determine the attributes associated with the request received in 205. In certain embodiments, master control subsystem 120 may be configured to parse the received request to determine the associated attributes. These attributes determined for the request are then used by dynamic schema allocation system 110 to find a particular database instance that satisfies the requested attributes. In some embodiments, dynamic schema allocation system 110 may store the request associated attributes in a data store accessible to dynamic schema allocation system 110.

At step 215, dynamic schema allocation system 110 identifies, from the multiple database instances available to dynamic schema allocation system 110, a set of one or database instances that satisfy all the attributes determined in 210 for the database schema request received in 205. The request attributes may be matched or satisfied by a single database instance, by multiple database instances, or by no database instance. In the situation where none of the database instances available to dynamic schema allocation system 110 can satisfy or match the attributes requested in the database schema request, dynamic schema allocation system 110 may send a response to the requestor of the database schema that the requested database schema could not be allocated. If one or more database instances satisfy the request attributes, then processing continues with 225.

In certain embodiments, as part of the processing performed in 215, master control subsystem 120 of dynamic schema allocation system 110 may query database instance information data store 135 to identify all the registered database instances that are available for servicing the database schema request and attributes of the database instances. As previously described, one or more 3$^{rd}$ parties may make database instances available to dynamic schema allocation system 110. These database instances are registered dynamic schema allocation system 110. The database instances available to dynamic schema allocation system 110 may include database instances of different types (e.g., database different vendors) and capabilities, multiple database instances of the same type and/or capability, different versions of database instances, and the like. For example, the database instances available to dynamic schema allocation system 110 may include a first database instance for a MySQL standard edition database, a second database instance for a MySQL enterprise edition database, a third database instance for a MySQL Cluster Carrier Grade Edition, a fourth database instance for an Oracle Database 11g database, a fifth database instance for an Oracle database 12c, a sixth database instance for an DB2 database. Information identifying the registered database instances may be stored in database instance information data store 135.

The process of making database instances available to dynamic schema allocation system 110 may be separate and independent of the process of allocating database schemas to clients. Providers of database instances may thus provide database instances independently from the database schema allocation processing.

Information identifying the registered database instances may be stored in database instance information data store 135. The information stored in data store 135 may also include, for each registered database instance, information identifying the attributes of the database instance, where the attributes may identify the functions, capabilities, characteristics, etc. of the database instance. Attributes information associated with a database instance may include, for example, information identifying a database instance size (e.g. memory), a database type (e.g., may identify a database vendor such as Oracle®, IBM®, Microsoft® or a certain type or name of a database such as DB2 database instance, Azure SQL or MySQL database instance, etc.), a database instance version (e.g., Oracle Database 12c, Oracle Database 11g, Oracle Database 10g, SQL9, SQL10, etc.), database instance capabilities (e.g. languages supported, data formats supported, operations supported, transaction definitions, particular organization of database objects, error handling features, rollback features for transactions, operating system/software support, and the like), and the like. The information stored in data store 135 for a database instance may also include information identifying the free space remaining on the database instance that can be used by dynamic schema allocation system 110 for allocating schemas in response to database schema requests.

As part of the processing performed in 215, dynamic schema allocation system 110 may compare the one or more attributes specified in the database schema request received in 205 with the attributes of the registered database instances (which may be stored in data store 135) to identify a set of one or more database instances that satisfy or match all the attributes requested in the database schema request received in 205.

For example, if the attributes determined in 210 were (similar to Example 1 shown above),
    database type=Oracle
    database schema size=100 MB
    required time duration=4 hours
    format of response/reply=JSON
    database capabilities=PL/SQL language commands.
then only those database instances, from the database instances available to dynamic schema allocation system 110, that can satisfy all of the above attributes are selected in 215. The comparisons in 215 may be performed in a linear fashion or parallel fashion. As a result of this processing, only those database instances are selected that of type Oracle, have available schema size of at least 100 MB, can be allocated for 4 hours, response can be provided in JSON format, and the can support PL/SQL language commands (or specific commands specified in the request).

If no matching database instances are identified in 215, then dynamic schema allocation system 110 may send a response to the requestor that no schema could be allocated. In certain embodiments, the response may be sent in machine readable format, which can be read by the requesting client (e.g., a client application). Based upon the response, the client or requestor may optionally send another database schema request, potentially with a less limiting set of attributes so as to increase the possibility of a database instance match.

At 220, dynamic schema allocation system 110 determines whether multiple matching database instances were identified in 220. If it is determined in 225 that multiple matching database instances were determined, then processing continues with 225, else if only one single matching database instance was identified, then processing continues with 230.

At 225, dynamic schema allocation system 110 performs additional processing to select a single database instance from the multiple matching database instances identified in 215. Various different types of additional processing may be performed to select a single database instance. In certain embodiments, load balancing processing is performed to select a single database instance. This is described below with respect to FIG. 6. Once a single database instances has been selected based upon the additional processing in 225, processing then continues with 230.

At 230, it is assumed that a single database instance has been selected, either in 215 or via the processing in 225. At 230, a temporary database schema as requested by the database schema request received in 205 is then allocated from the single database instance. The temporary database schema allocated in 230 represents a portion of the selected single database instance and may comprise a set of tables, relationships between them, and logic that can be executed when data is added/modified/deleted to the tables. In certain embodiments, an identifier may be generated for identifying the allocated database schema.

At 235, a response is generated by dynamic schema allocation system 110 and transmitted to the requestor (e.g., the source or originator of the database schema request received in 205). The response generated in 235 and transmitted to the requestor comprises information that enables the requestor to access and use the database schema allocated in 230.

In certain embodiments, as part of the processing in 235, dynamic schema allocation system 110 may generate access credentials for the allocated database schema. The access credentials may include, for example, authentication information that the requestor (e.g., a requesting client device) may use to access and use the allocated database schema. The access credentials may include, for example, a username, a password, a database schema port, a database schema host secure identifier (SID), and the like. The access credentials may be included in the response generated and transmitted in 235.

As part of the processing in 230 and 235, dynamic schema allocation system 110 may store information regarding the allocated schema in client allocation information data store 140. The information stored in data store 140 may include, for example, information identifying the client/requestor (e.g., a client identifier or client device identifier identifying the source of the database schema request) to whom the database schema has been allocated, a database schema identifier identifying the allocated database schema, access credentials for the allocated database schema identifying how the client/requestor can access and use the allocated database schema, information identifying the database instance from which the database schema was allocated, time information identifying a period of time when the client can use and access the allocated database schema (e.g., a starting time value and an ending time value identifying when the database schema can be used by the client), a time when the database schema was allocated and transmitted to the requestor, and the like. Dynamic schema allocation system 110 may also update the "free space remaining" attribute information stored in database instance information data store 135 for the database instance from which the database schema was allocated to reflect the new free memory value after the allocation.

In some instances, the database schema request received in 205 may itself identify a specific format for the response/reply and/or a specific protocol to be used for communicating the response/reply to the requestor. The specific format and/or protocol may be specified as one or the attributes determined from the database schema request. In such instances, the response generated in 235 may be generated according to the specified format. Further, if requested, the response may be communicated to the requestor using the specified protocol.

In certain instances, the response may be formatted in a machine readable format such as in JSON or XML, format. A machine readable format allows the consumer of the database schema to be able to read the information in the response and start using the allocated schema in an automated manner without requiring any manual intervention. For example, an application executing on a client device may receive the response and be able to read the machine-readable format and access and use the allocated database schema automatically, without requiring any manual intervention. Some database schema requests may specifically request the response to be in a machine-readable format.

When a user or consumer of the allocated database schema uses the schema, to the user, the database schema acts like a private database instance. Due at least in part to the access credentials as well as other processes described in certain embodiments, only authorized client devices are allowed read and/or write access to each database schema, which can prevent data collision.

The database schema allocated in 230 may be of a temporary nature such that the client or requestor can access and use the allocated schema for a specified time period. This time period is generally specified and included as an attribute in the database schema request received in 205. Accordingly, the database schema allocated in 230 is also associated with a time period during which the schema can be accessed and used. For each temporary schema that has been allocated, dynamic schema allocation system 110 is configured to automatically monitor the time periods for which the schema is valid for use by the client or user and reclaim the schema when the time period has expired. In certain embodiments, processing related to monitoring usage of allocated schemas and reclaiming of schemas after the time associated with the schemas has expired is performed by janitor subsystem 155 of dynamic schema allocation system 110. As shown in FIG. 2, at, janitor subsystem 155 may monitor and determine when an ending time value has been reached for an allocated database schema (i.e., the allocated database schema has expired) and invalidate the access credentials for the corresponding database schema upon expiration thereby preventing further usage of the allocated database schema. In certain embodiments, this expiration time information is stored in client allocation information data store 140 and accessed by janitor subsystem 155. The allocated database schema may then be reclaimed and added back to its corresponding database instance. Dynamic schema allocation system 110 may also update the "free space remaining" attribute information stored in database instance information data store 135 for that database instance to reflect the reclaimed database schema. Subsequently, dynamic schema allocation system 110 is free to allocate the reclaimed portion of the database instance for a new database schema request.

In certain embodiments, janitor subsystem 155 may be configured to wake up periodically, determine which allocated schemas have expired (i.e., are at end-of-life or past end-of life), and destroy and reclaim those schemas. Janitor subsystem 155 may then update the data stores 135 and 140 to reflect the reclaiming.

As described above, in circumstances where multiple matching database instances are identified, dynamic schema allocation system 110 may perform additional processing in 225 in FIG. 2 to select a single database instance from the multiple matching database instances. In certain embodiments, this additional processing involves doing a load analysis of the matching database instances and then selecting one with the lowest load. In this manner, the load is balanced across the various database instances.

Figure 6:
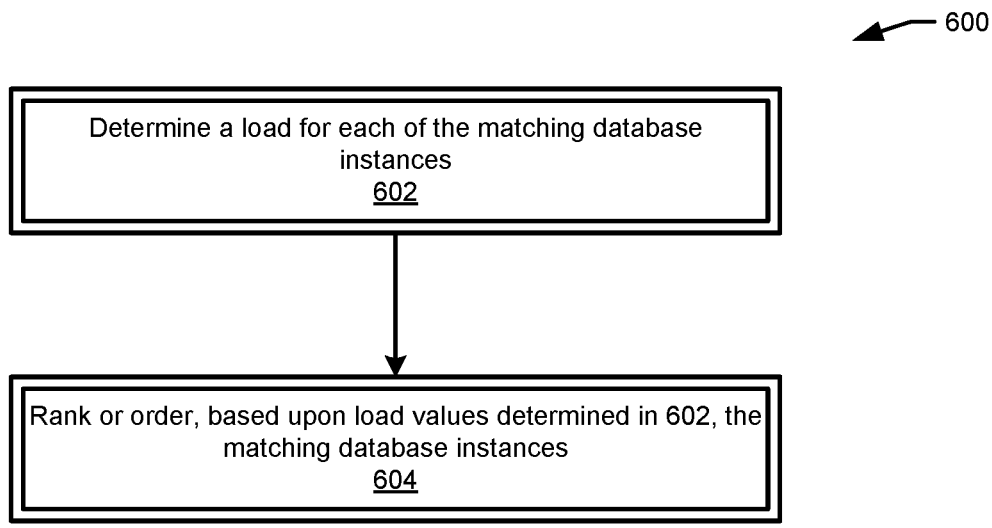
FIG. 6 depicts a simplified flow chart depicting a method of selecting a single database instance from multiple eligible matching database instances based upon load balancing according to certain embodiments.

FIG. 6 depicts a simplified flowchart 600 depicting a method of selecting a single database instance from multiple eligible matching database instances based upon load balancing according to certain embodiments. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 6 may be performed by dynamic schema allocation system 110 (e.g., by load balancing subsystem 160 of dynamic schema allocation system 110).

At 602, dynamic schema allocation system 110 determines a load value for each of the matching database instances. Different techniques may be used to calculate the load value for a database instance. According to one technique, the load may be determined based upon, as a percentage of proportion of the whole, how much memory of the database instance has already been allocated or used. In some instances, dynamic schema allocation system 110 may determine how much free memory is available for a database instance (e.g., say 30% of a database instance is free for allocation), then calculate the load value based upon this number (e.g., if 30% is free then the load value is calculated to be 70%.)

According to another technique, the load for a database instance may be based upon the number of current and/or previous allocations performed from the database instance. For example, the loads for database instance may be considered to be directly proportional to the number of current active allocations from the database instances. For example, if a database instance A has lesser number of current database schema allocations than a database instance B, then database instance A is considered to be less loaded than database instance B. in some instances, both the current allocations and past allocations for a database instance may be factored into calculation of a load value for the database instance. For example, based upon historical information, dynamic schema allocation system 110 may determine that a database instance from vendor A is more popular (i.e., has had more allocations from the database instance) than a database instance from vendor B, and if both are found to be matching database instances, then database instance B may be selected over database instance A.

According to yet another technique, the load for a database instance may be based upon the number of connections currently being made to the database instance. In certain embodiments, the time period for which the database schema is requested may also be taken into account for the load analysis. For example, the load value may be projected for the particular time period. In yet other embodiments, other factors, or combinations of previously described techniques and/or other techniques may be used for calculating the loads for the matching database instances.

At 604, the multiple matching database instances may be ranked or ordered based upon the load values determined in 602. Then, at 606, the database instance with the lowest load may be selected as the database instance for performing the schema allocation. For example, if there are three matching database instances A, B, and C with associated load values of 70%, (for A), 80% (for B), and 85% (for C), respectively, then database instance A may be selected for allocation.

As described herein, dynamic schema allocation system 110 provided a centralized infrastructure for receiving database schema requests and for servicing those requests with schemas from multiple database instances, potentially of different types and capabilities. The reclaiming of previously allocated database schemas upon expiration of the schemas is also performed in a dynamic and automated manner. The allocation of database schemas is performed in a dynamic and automated manner, substantially free of any manual intervention.

Dynamic schema allocation system 110 supports multiple different communication protocols and formats, both for receiving database schema requests and for serving out database schemas. New protocols and formats can be supported by hot plugging interfaces and listeners for supporting those protocols or formats all without having to bring down or stop or interrupt the functioning of dynamic schema allocation system 110. New database instances can also be made available to the system in a hot-pluggable manner without having to bring down or stop or interrupt the functioning of dynamic schema allocation system 110.

Dynamic schema allocation system 110 also performs load balancing across the database instances when servicing database schema request requests. This results in maximum and optimal usage of database instance resources. Allocation of database schemas can be distributed across database instances depending upon multiple factors. Database schema allocations from one database instance can be used to service multiple clients. In this manner, database instances may be shared across multiple clients. Each allocated database schema may be assigned different credentials and space, and as a result there are no conflicts between clients even if they create and/or access artifacts with the same name.

Figure 3:
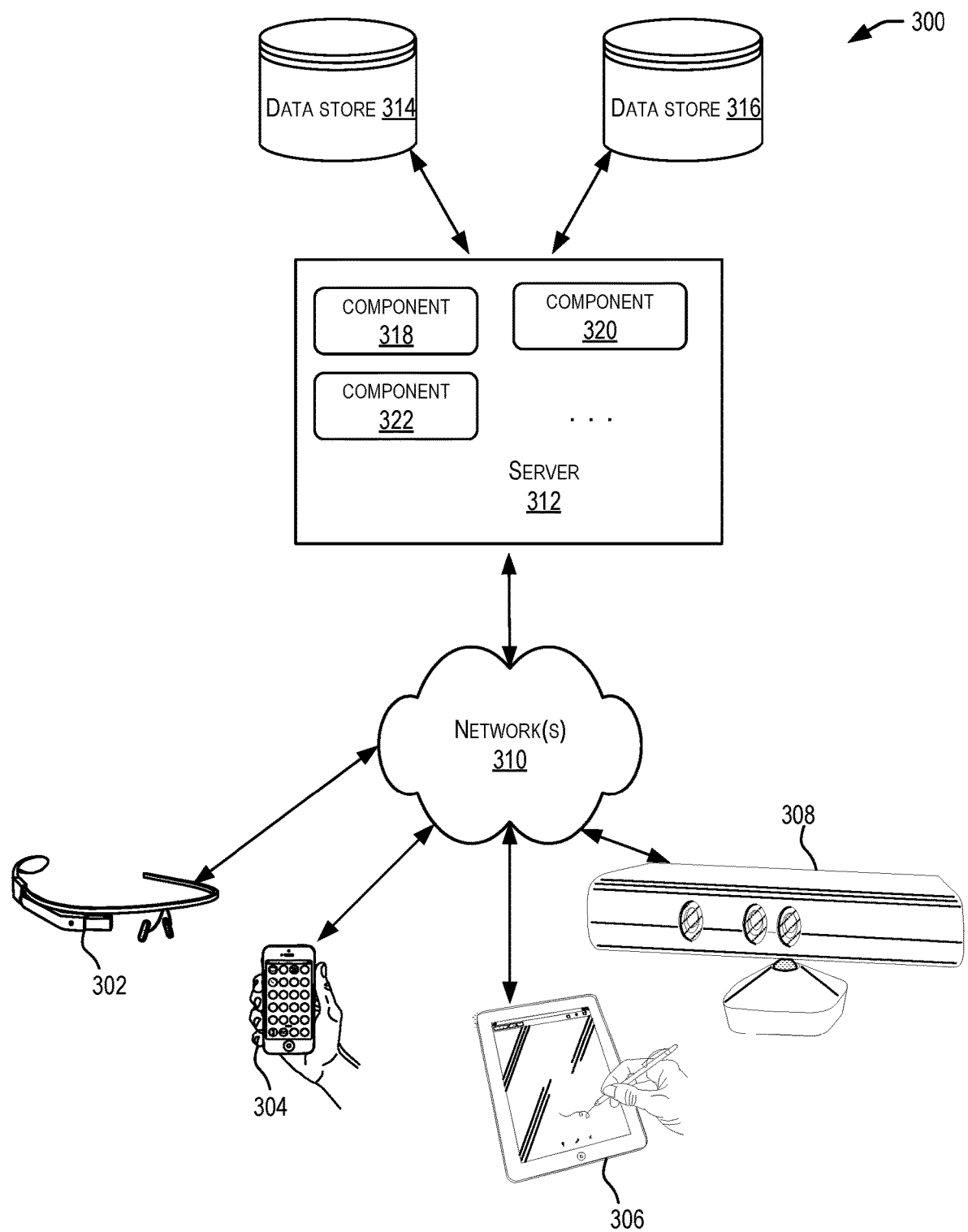
FIG. 3 depicts a simplified diagram of a distributed system for implementing certain embodiments.

FIG. 3 depicts a simplified diagram of a distributed system 300 for implementing certain embodiments disclosed herein. The distributed system 300 can implement embodiments of a data processing system for providing database schemas illustrated in FIG. 1. In the illustrated embodiment, distributed system 300 includes one or more client computing devices 302, 304, 306, and 308, which are configured to execute and operate a client application such as a web browser, proprietary client (e.g., Oracle Forms), or the like over one or more network(s) 310. In certain embodiments, the one or more client computing devices 302-308 can be the used to send requests to the data processing system as described in FIG. 1. Server 312 may be communicatively coupled with remote client computing devices 302, 304, 306, and 308 via network 310. Server 312 can include the one or more computers on which embodiments of the data processing system for providing database schemas to one of client computing devices 302-308 illustrated in FIG. 1 is performed.

In various embodiments, server 312 may be adapted to run one or more services or software applications that enable dynamic lifecycle management (e.g., dynamic allocation, dynamic reclaiming) of database schemas as described herein. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 302, 304, 306, and/or 308. Users operating client computing devices 302, 304, 306, and/or 308 may in turn utilize one or more client applications to interact with server 312 to utilize the services provided by these components.

In the configuration depicted in FIG. 3, server 312 may include one or more components 318, 320 and 322 that implement the functions performed by server 312. In other embodiments, one or more of the components of system 300 and/or the services provided by these components may also be implemented by one or more of the client computing devices 302, 304, 306, and/or 308. Users operating the client computing devices may then utilize one or more client applications to use the services provided by these components. These components may be implemented in hardware, firmware, software, or combinations thereof. It should be appreciated that various different system configurations are possible, which may be different from distributed system 300. The embodiment shown in FIG. 3 is thus one example of a distributed system for implementing an embodiment system and is not intended to be limiting.

Users may use client computing devices 302, 304, 306, and/or 308 to interact with server 312. A client device may provide an interface that enables a user of the client device to interact with the client device. The client device may also output information to the user via this interface. Although exemplary distributed system 300 is shown with four client computing devices, any number of client computing devices may be supported. Other devices, such as devices with sensors, etc., may interact with server 312.

Client computing devices 302, 304, 306, and/or 308 may include various types of computing systems such as portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 302, 304, 306, and 308 may be any other electronic device, such as a thin-client computer, an Internet-enabled gaming system (e.g., a Microsoft Xbox gaming console with or without a Kinect® gesture input device), and/or a personal messaging device, capable of communicating over network(s) 310. The client devices may be capable of executing various different applications such as various Internet-related apps, communication applications (e.g., E-mail applications, short message service (SMS) applications) and may use various communication protocols.

Network(s) 310 in distributed system 300 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 210 can be a local area network (LAN), such as one based on Ethernet, Token-Ring and/or the like. Network(s) 210 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 312 can include one or more virtual machines running virtual operating systems, or other computing architectures involving virtualization. One or more flexible pools of logical storage devices can be virtualized to maintain virtual storage devices for the server. Virtual networks can be controlled by server 312 using software defined networking. In various embodiments, server 312 may be adapted to run one or more services or software applications described in the foregoing disclosure. For example, server 312 may correspond to a server for performing processing described above according to an embodiment of the present disclosure.

The computing systems implementing server 312 may run one or more operating system including any of those discussed above, as well as any commercially available server operating system. Server 312 may also run any of a variety of additional server applications and/or mid-tier applications, including HTTP servers, FTP servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 312 may include one or more applications to analyze and consolidate data feeds and/or event updates received from users of client computing devices 302, 304, 306, and 308. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 312 may also include one or more applications to display the data feeds and/or real-time events via one or more display devices of client computing devices 302, 304, 306, and 308.

Distributed system 300 may also include one or more data stores 314 and 316. For example, one or more of the data stores 314, 316 may be used as data stores 135 and 140 depicted in FIG. 1. In some embodiments, data stores 314 and 316 may be databases. Data stores 314 and 316 may reside in a variety of locations. By way of example, one or more of data stores 314 and 316 may reside on a non-transitory storage medium local to (and/or resident in) server 312. Alternatively, data stores 314 and 316 may be remote from server 312 and in communication with server 312 via a network-based or dedicated connection. In one set of embodiments, data stores 314 and 316 may reside in a storage-area network (SAN). Similarly, any necessary files for performing the functions attributed to server 312 may be stored locally on server 312 and/or remotely, as appropriate. In one set of embodiments, data stores 314 and 316 may include relational databases, such as databases provided by Oracle, that are adapted to store, update, and retrieve data in response to SQL-formatted commands. For example, databases from the database instance 175 or database instance 180 shown in FIG. 1 can be included in the one or more data stores 314 and 316.

Figure 4:
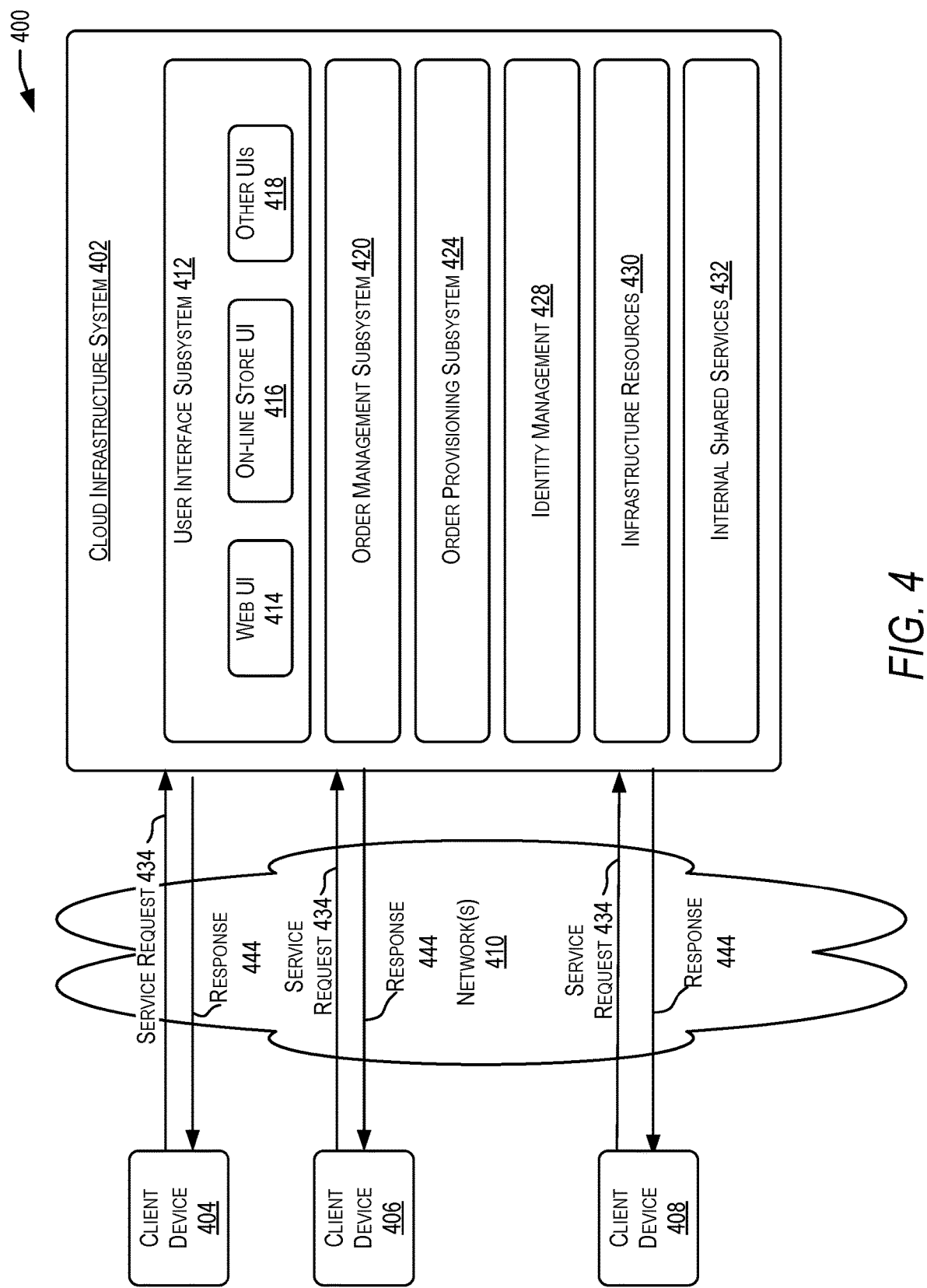
FIG. 4 is a simplified block diagram of a cloud-based system environment in which database schema-related services may be offered as cloud services, in accordance with certain embodiments.

In certain embodiments, the dynamic database schema-related functionalities described in this disclosure may be offered as services via a cloud environment. FIG. 4 is a simplified block diagram of a cloud-based system environment in which database schema-related services may be offered as cloud services, in accordance with certain embodiments. In the embodiment depicted in FIG. 4, cloud infrastructure system 402 may provide one or more cloud services that may be requested by users using one or more client computing devices 404, 406, and 408. Cloud infrastructure system 402 may comprise one or more computers and/or servers that may include those described above for server 312. The computers in cloud infrastructure system 402 may be organized as general purpose computers, specialized server computers, server farms, server clusters, or any other appropriate arrangement and/or combination.

Network(s) 410 may facilitate communications and exchange of data between clients devices 404, 406, and 408 and cloud infrastructure system 402. Each network may be any type of network familiar to those skilled in the art that can support data communications using any of a variety of commercially-available protocols, including those described above for network(s) 310.

The embodiment depicted in FIG. 4 is only one example of a cloud infrastructure system and is not intended to be limiting. It should be appreciated that, in some other embodiments, cloud infrastructure system 402 may have more or fewer components than those depicted in FIG. 4, may combine two or more components, or may have a different configuration or arrangement of components. For example, although FIG. 4 depicts three client computing devices, any number of client computing devices may be supported in alternative embodiments.

The term cloud service is generally used to refer to a service that is made available to users on demand and via a communication network such as the Internet by systems (e.g., cloud infrastructure system 402) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In certain embodiments, cloud infrastructure system 402 may provide one or more cloud services using different models such as under a Software as a Service (SaaS) model, a Platform as a Service (PaaS) model, an Infrastructure as a Service (IaaS) model, and others, including hybrid service models. Cloud infrastructure system 402 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 402. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 402. Cloud infrastructure system 402 then performs processing to provide the services requested in the customer's subscription order. For example, a user may subscribe to a database schemas allocation service provided by system 402. Cloud infrastructure system 402 may be configured to provide one or even multiple cloud services.

Cloud infrastructure system 402 may provide the cloud services via different deployment models. In a public cloud model, cloud infrastructure system 402 may be owned by a third party cloud services provider and the cloud services are offered to any general public customer, where the customer can be an individual or an enterprise. In certain other embodiments, under a private cloud model, cloud infrastructure system 402 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 402 and the services provided may be shared by several organizations in a related community. Various other models such as hybrids of the above mentioned models may also be used.

Client computing devices 404, 406, and 408 may be of different types (such as devices 302, 304, 306, and 308 depicted in FIG. 3) and may be capable of operating one or more client applications. A user may use a client device to interact with cloud infrastructure system 402, such as to request a service provided by cloud infrastructure system 402. For example, a user may use a client device to request a database schema-related service.

In some embodiments, the processing performed by cloud infrastructure system 402 for providing the database schema-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 402 for selecting a database instance for servicing a database schema request. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain embodiments, to facilitate efficient provisioning of these resources for supporting the various cloud services provided by cloud infrastructure system 402 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 402 may itself internally use services 432 that are shared by different components of cloud infrastructure system 402 and which facilitate the provisioning of services by cloud infrastructure system 402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 402 may comprise multiple subsystems. These subsystems may be implemented in software, or hardware, or combinations thereof. As depicted in FIG. 4, the subsystems may include a user interface subsystem 412 that enables users or customers of cloud infrastructure system 402 to interact with cloud infrastructure system 402. User interface subsystem 412 may include various different interfaces such as a web interface 414, an online store interface 416 where cloud services provided by cloud infrastructure system 402 are advertised and are purchasable by a consumer, and other interfaces 418. For example, a customer may, using a client device, request (service request 434) one or more services provided by cloud infrastructure system 402 using one or more of interfaces 414, 416, and 418. For example, a customer may access the online store, browse cloud services offered by cloud infrastructure system 402, and place a subscription order for one or more services offered by cloud infrastructure system 402 that the customer wishes to subscribe to. The service request may include information identifying the customer and one or more services that the customer desires to subscribe to. For example, a customer may place a subscription order for a database schema-related service offered by cloud infrastructure system 402.

In certain embodiments, such as the embodiment depicted in FIG. 4, cloud infrastructure system 402 may comprise an order management subsystem (OMS) 420 that is configured to process the new order. As part of this processing, OMS 420 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 420 may then invoke the order provisioning subsystem (OPS) 424 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 424 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 402 may send a response or notification 444 to the requesting customer to indicate when the requested service is now ready for use. In some instances, information (e.g., a link) may be sent to the customer that enables the customer to start using and availing the benefits of the requested services. In certain embodiments, for a customer requesting the database schema-related service, the response may include information that enables the customer to start using the service.

Cloud infrastructure system 402 may provide services to multiple customers. For each customer, cloud infrastructure system 402 is responsible for managing information related to one or more subscription orders received from the customer, maintaining customer data related to the orders, and providing the requested services to the customer. Cloud infrastructure system 402 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 402 may provide services to multiple customers in parallel. Cloud infrastructure system 402 may store information for these customers, including possibly proprietary information. In certain embodiments, cloud infrastructure system 402 comprises an identity management subsystem (IMS) 428 that is configured to manage customers information and provide the separation of the managed information such that information related to one customer is not accessible by another customer. IMS 428 may be configured to provide various security-related services such as identity services, such as information access management, authentication and authorization services, services for managing customer identities and roles and related capabilities, and the like.

Figure 5:
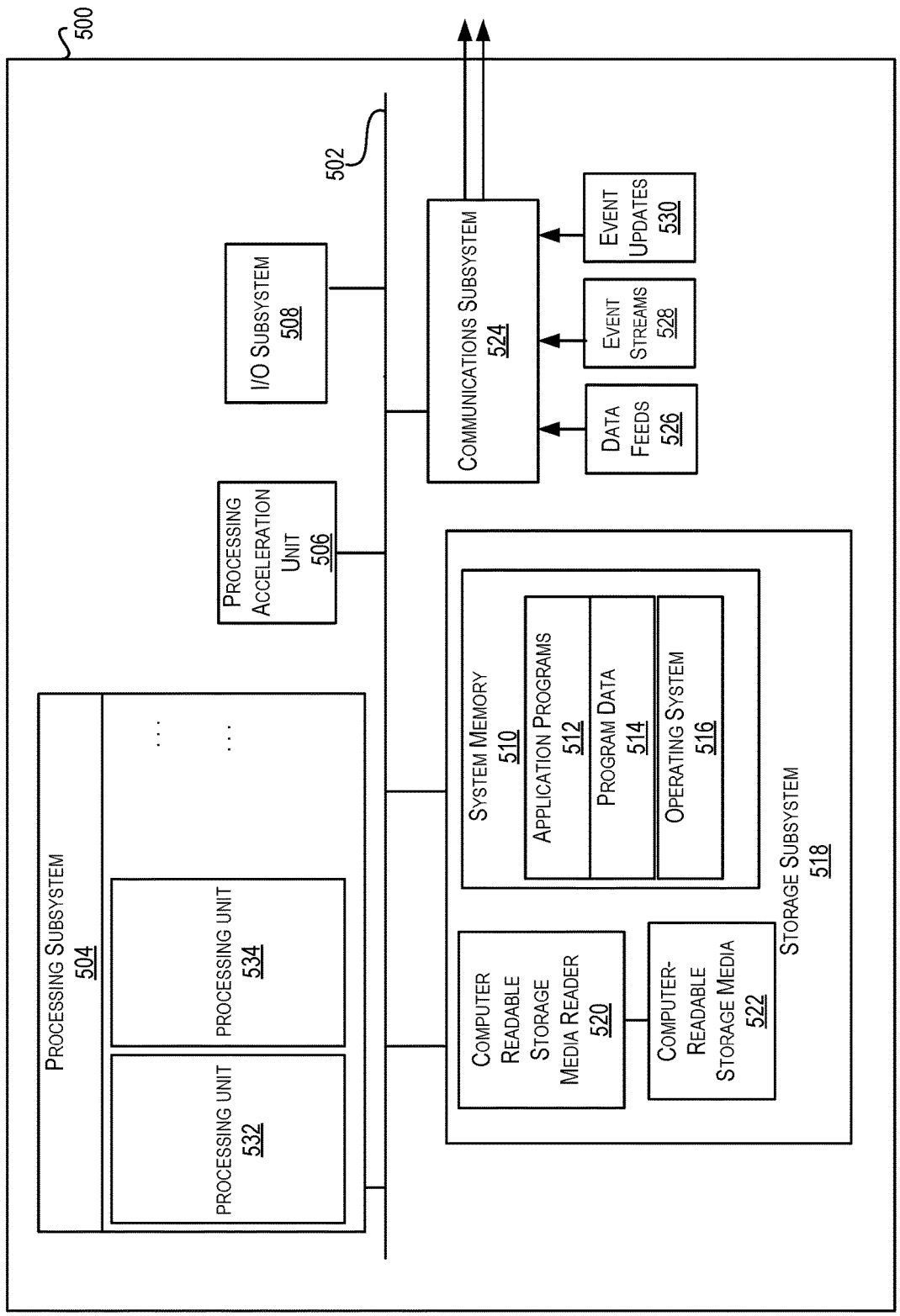
FIG. 5 depicts an exemplary data processing system that may be used to implement certain embodiments.

FIG. 5 illustrates an exemplary computer system 500 that may be used to certain embodiments. The computer system 500 may be used to implement any of the computer systems described above, such as data processing system 105 depicted in FIG. 1. As shown in FIG. 5, computer system 500 includes various subsystems including a processing subsystem 504 that communicates with a number of other subsystems via a bus subsystem 502. These other subsystems may include a processing acceleration unit 506, an I/O subsystem 508, a storage subsystem 518, and a communications subsystem 524. Storage subsystem 518 may include non-transitory computer-readable storage media including storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing subsystem 504 controls the operation of computer system 500 and may comprise one or more processors, application specific integrated circuits (ASICs), or field programmable gate arrays (FPGAs). The processors may include be single core or multicore processors. The processing resources of computer system 500 can be organized into one or more processing units 532, 534, etc. A processing unit may include one or more processors, one or more cores from the same or different processors, a combination of cores and processors, or other combinations of cores and processors. In some embodiments, processing subsystem 504 can include one or more special purpose co-processors such as graphics processors, digital signal processors (DSPs), or the like. In some embodiments, some or all of the processing units of processing subsystem 504 can be implemented using customized circuits, such as application specific integrated circuits (ASICs), or field programmable gate arrays (FPGAs).

In some embodiments, the processing units in processing subsystem 504 can execute instructions stored in system memory 510 or on computer readable storage media 522. In various embodiments, the processing units can execute a variety of programs or code instructions and can maintain multiple concurrently executing programs or processes. At any given time, some or all of the program code to be executed can be resident in system memory 510 and/or on computer-readable storage media 522 including potentially on one or more storage devices. Through suitable programming, processing subsystem 504 can provide various functionalities described above. In instances where computer system 500 is executing one or more virtual machines, one or more processing units may be allocated to each virtual machine.

In certain embodiments, a processing acceleration unit 506 may optionally be provided for performing customized processing or for off-loading some of the processing performed by processing subsystem 504 so as to accelerate the overall processing performed by computer system 500.

I/O subsystem 508 may include devices and mechanisms for inputting information to computer system 500 and/or for outputting information from or via computer system 500. In general, use of the term input device is intended to include all possible types of devices and mechanisms for inputting information to computer system 500. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 500 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 518 provides a repository or data store for storing information and data that is used by computer system 500. Storage subsystem 518 provides a tangible non-transitory computer-readable storage medium for storing the basic programming and data constructs that provide the functionality of some embodiments. Storage subsystem 518 may store software (e.g., programs, code modules, instructions) that when executed by processing subsystem 504 provides the functionality described above. The software may be executed by one or more processing units of processing subsystem 504. Storage subsystem 518 may also provide a repository for storing data used in accordance with the teachings of this disclosure.

Storage subsystem 518 may include one or more non-transitory memory devices, including volatile and non-volatile memory devices. As shown in FIG. 5, storage subsystem 518 includes a system memory 510 and a computer-readable storage media 522. System memory 510 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 500, such as during start-up, may typically be stored in the ROM. The RAM typically contains data and/or program modules that are presently being operated and executed by processing subsystem 504. In some implementations, system memory 510 may include multiple different types of memory, such as static random access memory (SRAM), dynamic random access memory (DRAM), and the like.

By way of example, and not limitation, as depicted in FIG. 5, system memory 510 may load application programs 512 that are being executed, which may include various applications such as Web browsers, mid-tier applications, relational database management systems (RDBMS), etc., program data 514, and an operating system 516. By way of example, operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 522 may store programming and data constructs that provide the functionality of some embodiments. Computer-readable media 522 may provide storage of computer-readable instructions, data structures, program modules, and other data for computer system 500. Software (programs, code modules, instructions) that, when executed by processing subsystem 504 provides the functionality described above, may be stored in storage subsystem 518. By way of example, computer-readable storage media 522 may include non-volatile memory such as a hard disk drive, a magnetic disk drive, an optical disk drive such as a CD ROM, DVD, a Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 518 may also include a computer-readable storage media reader 520 that can further be connected to computer-readable storage media 522. Reader 520 may receive and be configured to read data from a memory device such as a disk, a flash drive, etc.

In certain embodiments, computer system 500 may support virtualization technologies, including but not limited to virtualization of processing and memory resources. For example, computer system 500 may provide support for executing one or more virtual machines. In certain embodiments, computer system 500 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 500. Accordingly, multiple operating systems may potentially be run concurrently by computer system 500.

Communications subsystem 524 provides an interface to other computer systems and networks. Communications subsystem 524 serves as an interface for receiving data from and transmitting data to other systems from computer system 500. For example, communications subsystem 524 may enable computer system 500 to establish a communication channel to one or more client devices via the Internet for receiving and sending information from and to the client devices.

Communication subsystem 524 may support both wired and/or wireless communication protocols. For example, in certain embodiments, communications subsystem 524 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 524 can provide wired network connectivity (e.g., Ethernet) in addition to or instead of a wireless interface.

Communication subsystem 524 can receive and transmit data in various forms. For example, in some embodiments, in addition to other forms, communications subsystem 524 may receive input communications in the form of structured and/or unstructured data feeds 526, event streams 528, event updates 530, and the like. For example, communications subsystem 524 may be configured to receive (or send) data feeds 526 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 524 may be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 524 may also be configured to communicate data from computer system 500 to other computer systems or networks. The data may be communicated in various different forms such as structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 500 depicted in FIG. 5 is intended only as a specific example. Many other configurations having more or fewer components than the system depicted in FIG. 5 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method comprising:
    receiving, by a data processing system from a requestor, a request for a database schema;
    determining, by the data processing system, a set of one or more attributes specified in the request, wherein the set of one or more attributes specified in the request includes an attribute indicating that the database schema is requested for a first time period;
    accessing, by the data processing system, first information associated with a plurality of database instances, wherein, for each database instance in the plurality of database instances, the first information identifies one or more attributes associated with a database instance;
    selecting, by the data processing system, based upon the first information and the set of one or more attributes determined from the request, a first database instance from the plurality of database instances, wherein selecting the first database instance comprises comparing the set of one or more attributes specified in the request with the attributes associated with the plurality of database instances to identify a set of one or more database instances from the plurality of database instances that match the set of one or more attributes specified in the request, the set of one or more database instances including the first database instance that was selected;
    allocating, by the data processing system, based upon the set of one or more attributes specified in the request, the database schema from the first database instance that was selected;
    associating, by the data processing system, the first time period with the allocated database schema, the first time period identifying a period of time when use of the allocated database schema by the requestor is valid;
    generating, by the data processing system, a response to the request, wherein the response comprises information that enables the requestor to access and use the allocated database schema for the first time period;
    transmitting the response from the data processing system to the requestor;
    determining when the first time period has expired; and
    upon determining that the first time period has expired, reclaiming the database schema, the reclaiming comprising freeing the database schema in the database instance.

2. The computer-implemented method of claim 1, wherein the set of one or more attributes specified in the request includes at least one of: a schema type, a schema memory size, a capability to be provided by the database schema, a language to be supported by the database schema, a particular version of a database.

3. The computer-implemented method of claim 1, wherein:
    the set of one or more database instances comprises multiple database instances including the first database instance and a second database instance;
    the first database instance is a database instance from a first vendor; and
    the second database instance is a database instance from a second vendor, where the second vendor is different from the first vendor.

4. The computer-implemented method of claim 1 wherein:
    the set of one or more database instances comprises multiple database instances; and
    selecting the first database instance from the set of one or more database instances comprises:
        determining a load value for each database instance in the set of one or more database instances; and
        determining, by the data processing system, that the first database instance has a lowest load value compared to other database instances in the set of one or more database instances.

5. The computer-implemented method of claim 4 wherein determining the load value for each database instance in the set of one or more database instances comprises:

determining, for the database instance, a percentage of memory of the database instance that is already allocated.

6. The computer-implemented method of claim 4 wherein determining the load value for each database instance in the set of one or more database instances comprises:
   determining, for the database instance, a number of current connections to the database instance; or
   determining, for the database instance, a number of prior connections to the database instance.

7. The computer-implemented method of claim 4, further comprising
   determining the load value for each database instance in the set of one or more database instances comprises using the first time period to determine the load value.

8. The computer-implemented method of claim 1, wherein generating the response comprises:
   generating, by the data processing system, access credentials for the database schema, the access credentials including one or more credentials for accessing the allocated database schema; and
   including the access credentials in the response.

9. The computer-implemented method of claim 1, wherein:
   the set of one or more attributes specified in the request includes an attribute indicating a first format to be used for the response; and
   generating the response comprises generating the response according to the first format.

10. The computer-implemented method of claim 1, wherein:
    the set of one or more attributes specified in the request includes an attribute indicating a first protocol to be for the response; and
    transmitting the response comprises transmitting the response using the first protocol.

11. The computer-implemented method of claim 1, wherein generating the response comprises generating the response in a machine-readable format.

12. A non-transitory computer-readable memory storing a plurality of instructions executable by one or more processors, the plurality of instructions comprising instructions that cause a first data processing system to:
    receive a request for a database schema from a requestor;
    determine a set of one or more attributes specified in the request, wherein the set of one or more attributes specified in the request includes an attribute indicating that the database schema is requested for a first time period;
    access first information associated with a plurality of database instances, wherein, for each database instance in the plurality of database instances, the first information identifies one or more attributes associated with the database instance;
    select, based upon the first information and the set of one or more attributes determined from the request, a first database instance from the plurality of database instances, wherein selecting the first database instance comprises comparing the set of one or more attributes specified in the request with the attributes associated with the plurality of database instances to identify a set of one or more database instances from the plurality of database instances that match the set of one or more attributes specified in the request, the set of one or more database instances including the first database instance that was selected;
    allocate, based upon the set of one or more attributes specified in the request, the database schema from the first database instance that was selected;
    associate the first time period with the allocated database schema, the first time period identifying a period of time when use of the allocated database schema by the requestor is valid;
    generate a response to the request, wherein the response comprises information that enables the requestor to access and use the allocated database schema for the first time period;
    transmit the response from the first data processing system to the requestor
    determine when the first time period has expired; and
    upon determining that the first time period has expired, reclaim the database schema, the reclaiming comprising freeing the database schema in the database instance.

13. The non-transitory computer-readable memory of claim 12, wherein the set of one or more attributes specified in the request includes at least one of: a schema type, a schema memory size, a capability to be provided by the database schema, a language to be supported by the database schema, a particular version of a database.

14. The non-transitory computer-readable memory of claim 12, wherein:
    the set of one or more database instances comprises multiple database instances including the first database instance and a second database instance;
    the first database instance is a database instance from a first vendor; and
    the second database instance is a database instance from a second vendor, where the second vendor is different from the first vendor.

15. The non-transitory computer-readable memory of claim 12, wherein the set of one or more database instances comprises multiple database instances; and
    the plurality of instructions further comprise instructions that cause the first data processing system to:
    select the first database instance from the set of one or more database instances comprises:
    determine a load value for each database instance in the set of one or more database instances; and
    determine that the first database instance has a lowest load value compared to other database instances in the set of one or more database instances.

16. A system comprising:
    one or more processors; and
    a memory coupled with the one or more processors, the memory configured to store instructions that when executed by the one or more processors cause the one or more processors to:
    receive a request for a database schema by a requestor;
    determine a set of one or more attributes specified in the request, wherein the set of one or more attributes specified in the request includes an attribute indicating that the database schema is requested for a first time period;
    access first information associated with a plurality of database instances, wherein, for each database instance in the plurality of database instances, the first information identifies one or more attributes associated with the database instance;
    select, based upon the first information and the set of one or more attributes determined from the request, a first database instance from the plurality of database instances, wherein selecting the first database instance comprises comparing the set of one or more attributes specified in the request with the attributes associated with the plurality of database instances to identify a set of one or more database instances from the plurality of database instances that match the set of one or more attributes specified in the request, the set of one or more database instances including the first database instance that was selected;

allocate, based upon the set of one or more attributes specified in the request, the database schema from the first database instance that was selected;

associate the first time period with the allocated database schema, the first time period identifying a period of time when use of the allocated database schema by the requestor is valid;

generate a response to the request, wherein the response comprises information that enables the requestor to access and use the allocated database schema for the first time period;

transmit the response from a data processing system to the requestor;

determining when the first time period has expired; and upon determining that the first time period has expired, reclaiming the database schema, the reclaiming comprising freeing the database schema in the database instance.

17. The system of claim 16, wherein the set of one or more attributes specified in the request includes at least one of: a schema type, a schema memory size, a capability to be provided by the database schema, a language to be supported by the database schema, a particular version of a database.

18. The system of claim 16, wherein:
the set of one or more database instances comprises multiple database instances including the first database instance and a second database instance;
the first database instance is a database instance from a first vendor; and
the second database instance is a database instance from a second vendor, where the second vendor is different from the first vendor.

19. The system of claim 16, wherein the set of one or more database instances comprises multiple database instances; and
the memory configured to store instructions that when executed by the one or more processors further cause the one or more processors to:
select the first database instance from the set of one or more database instances comprises:
determine a load value for each database instance in the set of one or more database instances; and
determine that the first database instance has a lowest load value compared to other database instances in the set of one or more database instances.

* * * * *